US010129884B1

(12) United States Patent
    Krout

(10) Patent No.: US 10,129,884 B1
(45) Date of Patent: Nov. 13, 2018

(54) MULTI-THREAD TX/RX AND VIDEO DATA TO IMPROVE THROUGHPUT AND RELIABILITY OVER CELLULAR BASED COMMUNICATIONS SYSTEMS

(71) Applicant: Unmanned Autonomous Systems Safeflight Inc., Columbia, MD (US)

(72) Inventor: Tim Krout, Gainesville, FL (US)

(73) Assignee: Unmanned Autonomous Systems Safeflight Inc., Columbia, MD (US)

( * ) Notice: Subject to any disclaimer, the term of this patent is extended or adjusted under 35 U.S.C. 154(b) by 67 days.

(21) Appl. No.: 15/225,496

(22) Filed: Aug. 1, 2016

Related U.S. Application Data

(63) Continuation of application No. 15/017,503, filed on Feb. 5, 2016, now abandoned.

(60) Provisional application No. 62/112,414, filed on Feb. 5, 2015.

(51) Int. Cl.
    *H04L 12/26* (2006.01)
    *H04W 72/04* (2009.01)
    *H04L 29/08* (2006.01)
    *H04W 76/10* (2018.01)

(52) U.S. Cl.
    CPC ......... *H04W 72/0453* (2013.01); *H04L 67/06* (2013.01); *H04W 76/10* (2018.02)

(58) Field of Classification Search
    CPC ...................................................... H04L 47/10
    See application file for complete search history.

(56) References Cited

U.S. PATENT DOCUMENTS

| 5,383,190 A | 1/1995 | Janssen et al. |
| 5,557,608 A | 9/1996 | Calvignac et al. |
| 7,187,688 B2 | 3/2007 | Garmire et al. |
| 7,319,669 B1 | 1/2008 | Kunz et al. |
| 7,464,395 B2 | 12/2008 | Jiang et al. |
| 7,558,269 B2 | 7/2009 | Le Pennec et al. |
| 7,827,584 B2 | 11/2010 | Jiang et al. |
| 7,916,760 B2 | 3/2011 | Fujimoto et al. |
| 2005/0175013 A1 | 8/2005 | Le Pennec et al. |
| 2014/0219112 A1 | 8/2014 | Kherani et al. |

FOREIGN PATENT DOCUMENTS

| EP | 0684719 A1 | 11/1995 |
| WO | 2007109991 A1 | 10/2007 |

OTHER PUBLICATIONS

Military & Aerospace Electronics, by Courtney Howard,"UAV Command, Control & Communications" dated Jul. 11, 2013, [Online] Retrieved from the Internet on Jun. 6, 2016: <URL: http://www.militaryaerospace.com/articles/print/volume-24/issue-7/special-report/uav-com> (16 pages).

*Primary Examiner* — Shukri Taha

(57) ABSTRACT

This process utilizes multiple threads over multiple paths (towers and/or carriers) in order to improve the above noted problems by dynamically splitting multiple data streams, sending these multiple data streams over multiple data link paths over a cellular network and then combining some or all of the data streams to provide error free availability of relevant data and control while intelligently mitigating bandwidth limitations and "loss of link" or connection, for secure and safe UAS operations. Also described is a process to improve Throughput and/or Reliability of Video data when transmitted over multi-threaded, primarily but not limited to, cellular based communications systems, with a particular emphasis on video used in support of UAS missions.

20 Claims, 9 Drawing Sheets

Normal Packetized Video traversing A SINGLE thread Video system

Normal Packetized Video traversing A Three (3) threaded Video system
With NO improvement in Reliability Normal Packetized Video traversing a Three (3) threaded Video system
With 3X improvement in Reliability Normal Packetized Video traversing a Three (3) threaded Video system
APPROXIMATELLY a 6X improvement in Reliability Normal Packetized Video traversing a Three (3) threaded Video system
APPROXIMATELLY a 6X improvement in Reliability
(More Realistic implementation view)

MULTI-THREAD TX/RX AND VIDEO DATA TO IMPROVE THROUGHPUT AND RELIABILITY OVER CELLULAR BASED COMMUNICATIONS SYSTEMS

CROSS-REFERENCE TO RELATED APPLICATIONS

This invention is a Continuation of, and claims priority to and the benefit of, U.S. patent application Ser. No. 15/017,503, filed Feb. 5, 2016, and entitled "MULTI-THREAT TX/RX AND VIDEO DATA TO IMPROVE THROUGHPUT AND RELIABILITY OVER CELLULAR BASED COMMUNICATIONS SYSTEMS," which in turn claims priority to, and the benefit of U.S. Provisional Patent Application Ser. No. 62/112,414, filed Feb. 5, 2015, and entitled "MULTI-THREAD CELLULAR BASED COMMUNICATIONS SYSTEMS." The entire contents of the aforementioned applications are herein expressly incorporated by reference.

FIELD OF THE INVENTION

The invention relates to methods and systems for improving throughput and reliability of control, feedback, and video data transmitted over communication systems, particularly cellular based communications systems used in support of unmanned aerial systems.

DESCRIPTION OF THE BACKGROUND

Modern Unmanned Aerial Systems (UAS) or Unmanned Aerial Vehicles (UAV) typically rely on line-of-sight based wireless communications methods, systems and apparatus. There are currently two general methods of operation: a) remotely piloted by a wireless link, with a control station that provides direct control of the UAS or b) autonomously with directions via GPS and reports back via a live feed through a line-of-sight communications path.

A number of challenges exist in a rapidly growing UAS command, control, and communications area. Most prominent and widely debated issues are associated with the ability for UAS to directly communicate with various ground and air support in the area (regardless to which of the above mentioned UAS architecture they belong), secure downlink bandwidth limitation as more UAS are streaming data at the same time and at a higher throughput, and timely availability of relevant, post-processed data, as well as establishing secure/reliable communications between the ground station and the UAS to mitigate "loss of link" or connection being hacked for devious reasons.

Currently, Users establish a data connection where all data is transmitted/received over a single "thread." This approach cannot provide the communications throughput or reliability required for UAS missions. Satellite based links, are cost prohibitive, fragile, have limited bandwidth and limited time interval in the case of those not in geostationary orbits. In addition, militaries and technology firms worldwide are focused on: the ability to do as much autonomous onboard processing as possible and to reduce the volume of data exchanged between the UAV and ground station. The result is a reduction in the degree of real-time operator intervention via the control station. Further, Advanced UAS sensor payloads are acquiring a wealth of data, including full-motion video (FMV) and high-definition (HD) images. Bandwidth is often limited, and can prevent the transmission, sharing, and display of mission-critical information. Such network limitations are driving the need for efficient and secure data processing, as well as a robust and reliable UAS command, control and communications system that intelligently integrate safety and security.

Thus, a need exists for an improved process for a robust and stable command, control and communications system with an emphasis on UAS missions that improves throughput and reliability.

Advanced UAS sensor payloads are acquiring a wealth of data, including full-motion video (FMV) and high-definition (HD) images. Bandwidth is often limited, and can prevent the transmission, sharing, and display of mission-critical information. Such network limitations are driving the need for efficient and secure data processing, as well as a robust and stable UAS command, control and communications system that intelligently integrate safety and security.

Thus, a need exists for improved processes, methods and devices for a robust and stable UAS command, control and communications system that intelligently integrate safety, security, and autonomy.

SUMMARY OF THE INVENTION

According to one embodiment of the invention, a process utilizes multiple threads over multiple paths (towers and/or carriers) in order to improve the above noted problems by dynamically splitting multiple data streams, sending these multiple data streams over multiple data link paths over a cellular network and then combining some or all of the data streams to provide error free availability of relevant data and control while intelligently mitigating bandwidth limitations and "loss of link" or connection, for secure and safe UAS operations. According to a second embodiment of the invention, the inherent relative importance of some packets of video data over other packets of video data from the same source is used to prioritize packet delivery; however the process is not limited to video stream with varying degrees of importance between the frames. According to a third embodiment, the processes of both the first and second embodiments are used to send data over a cellular network.

DETAILED DESCRIPTION OF THE INVENTION

As used herein the term Unmanned Aerial System (UAS) emphasizes the importance of other elements beyond an aircraft itself. An Unmanned Aerial System (UAS) is defined as one that consists of the following subsystems and equipment: unmanned aircraft, control data links, control station (ground, ship, or air-based), support equipment, flight termination systems, launch/recovery equipment, and operator (or Pilot-in-Command).

As used herein the term "throughput" refers to network throughput which is the rate of successful message delivery over a communication channel. Throughput is usually measured in bits per second (bit/s or bps), and sometimes in data packets per second or data packets per time slot.

According to a first embodiment of the invention, a process for improving throughput and reliability over cellular based communication systems, particularly for use with unmanned aerial systems, the process includes three (3) components and taking advantage of the fact that data communications is packet based. The first (1) component is by opening multiple same carrier connections the user can increase throughput, although improvements in reliability are limited. The second (2) component is by opening multiple threads over multiple carriers whereby the user can increase throughput and/or reliability over (1) alone. The third (3) component is utilizing altitude to establish connections to extra towers that are now available to establish additional connections (threads).

Figure 1:
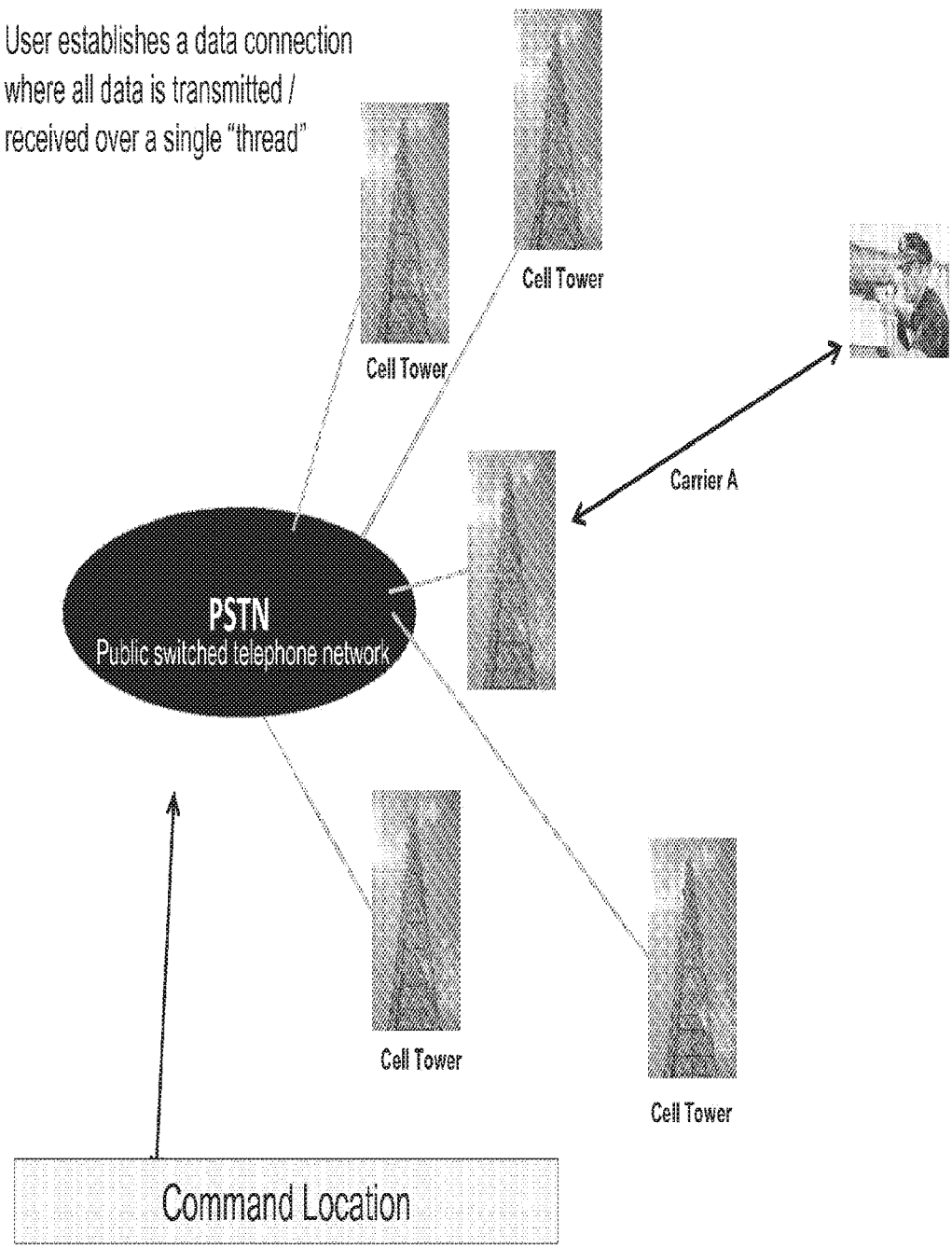
FIG. 1 is a block diagram illustrating how a user establishes a data connection where all data is transmitted/received over a single "thread.

FIG. 1 illustrates how data connections are previously/currently utilized. A first responder executes a cellular connection to the command center through a single "thread" or Carrier A and then switched via the Public Switched telephone Network.

Figure 2:
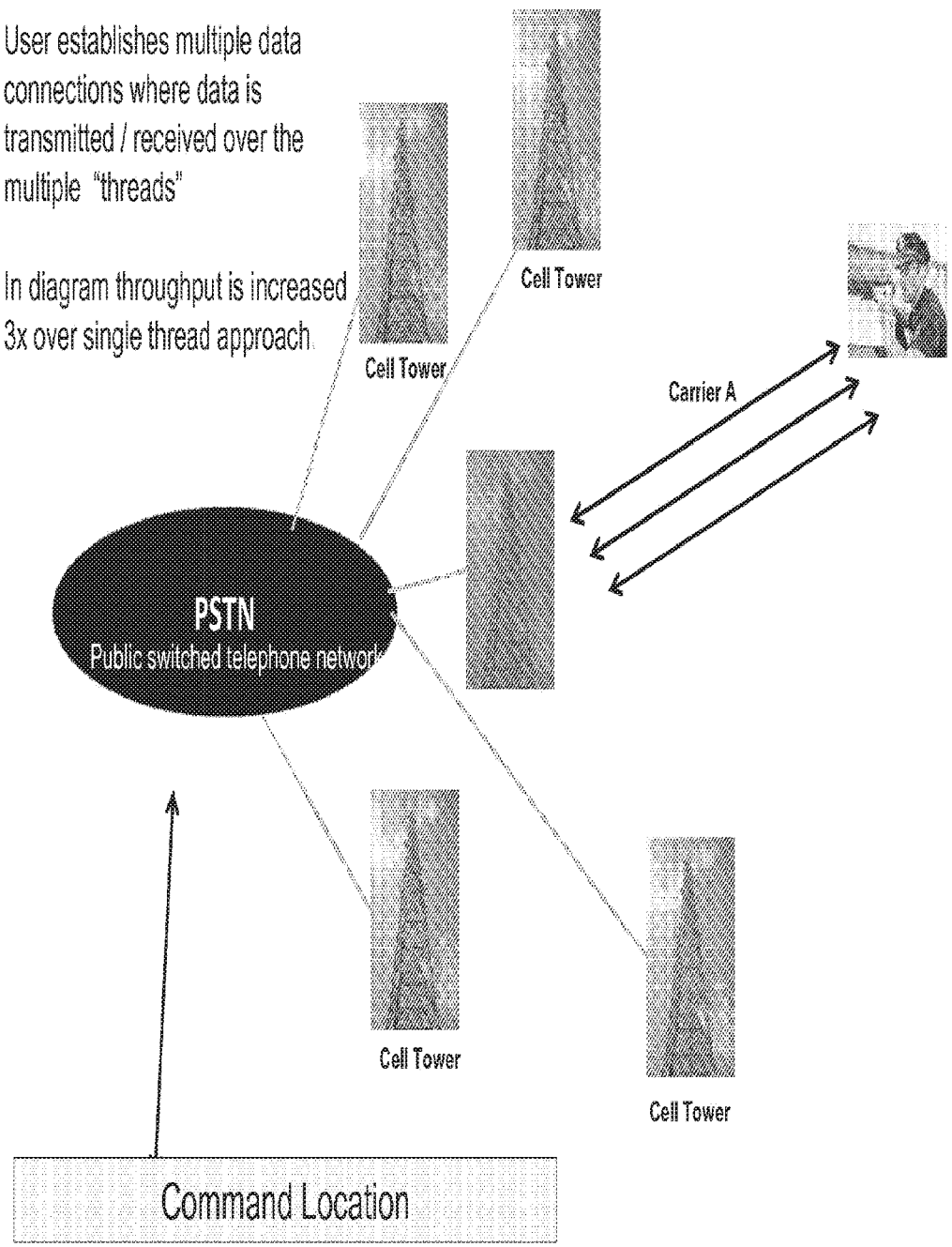
FIG. 2 is a block diagram illustrating how a user establishes multiple data connections where data is transmitted/received over the multiple "threads". According to the embodiment shown in this diagram, throughput is increased 3× over single thread approach

FIG. 2 illustrates the process and advantages of utilizing multiple "threads." By opening multiple same carrier connections the user can increase throughput, although improvements in reliability are limited. In FIG. 2, the user/first responder throughput can increase, basically, by 3X (FIG. 1 vs. FIG. 2) due to three threads vs. one. Reliability isn't increased substantially because it is likely that any errors on one thread will also occur on the other two threads. NOTE: three threads are drawn for simplicity of diagram and explanation. There is no limit with respect to the process of how many threads are utilized and the limit is defined by the number of connections the cellular provider will allow or technically support.

Figure 3:
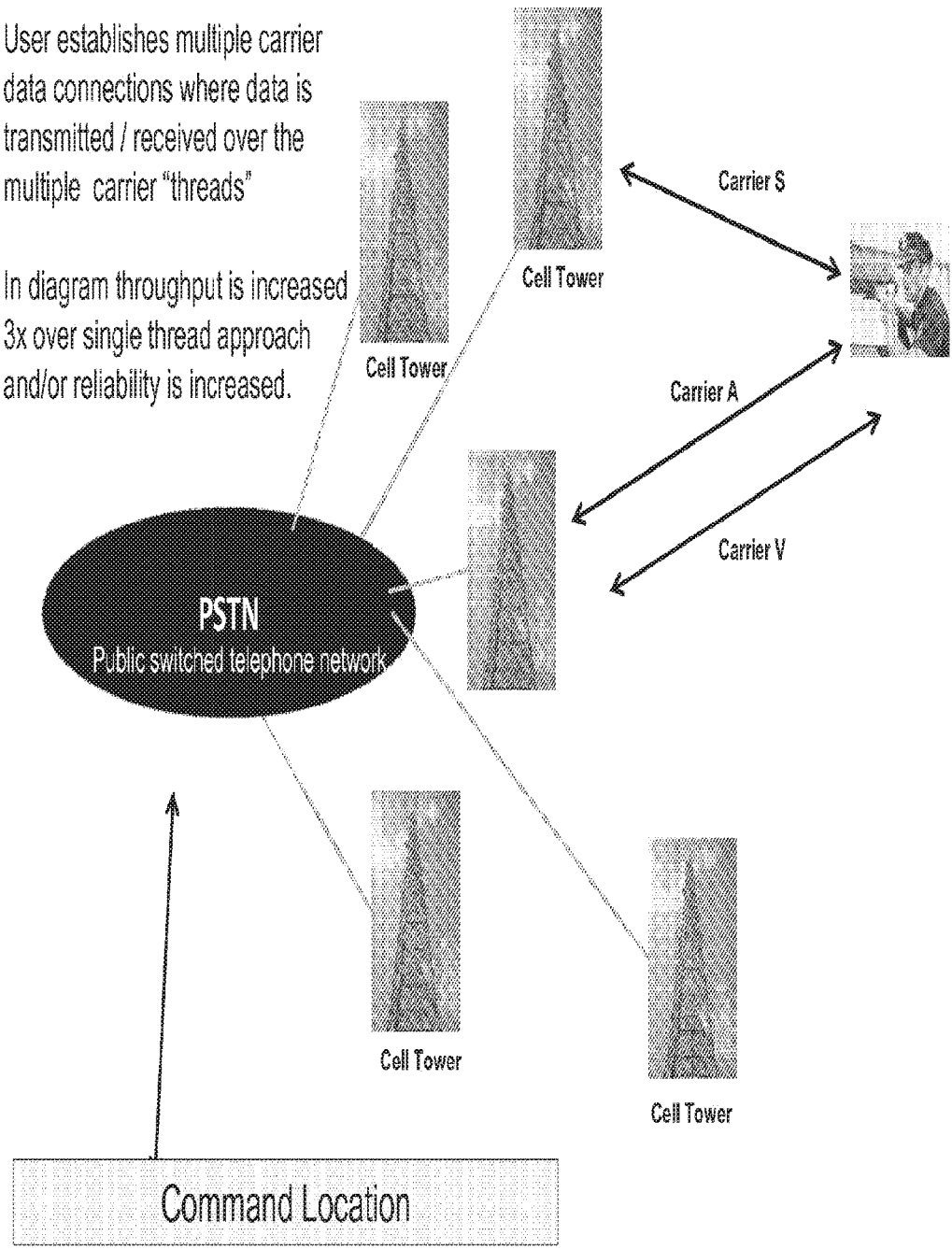
FIG. 3 is a block diagram illustrating an exemplary embodiment of increased throughput and reliability where User establishes multiple carrier data connections where data is transmitted/received over the multiple carrier "threads." According to the embodiment shown in this diagram, throughput is increased 3× over single thread approach and/or reliability is increased.

FIG. 3 illustrates the process and advantages of multiple threads over multiple carriers whereby the user can increase throughput and/or reliability over #1 alone. Like #1 the user can achieve the same 3× throughput improvements OR the user can now choose to tradeoff some of the throughput and improve reliability. For example, if maximum reliability improvement is desired the user data can be sent over all three paths concurrently. This would result in no throughput improvement but since each data packet is being sent three (3) times-once over each carrier path—any disruption of any one carrier would be compensated for by the data traversing an alternate path. OR the user can now choose a mix of throughput and reliability improvements; throughput and reliability can be traded. For example, each packet could be replicated 2× and transmitted over two separate paths and throughput could be increased 2× as well.

Figure 4:
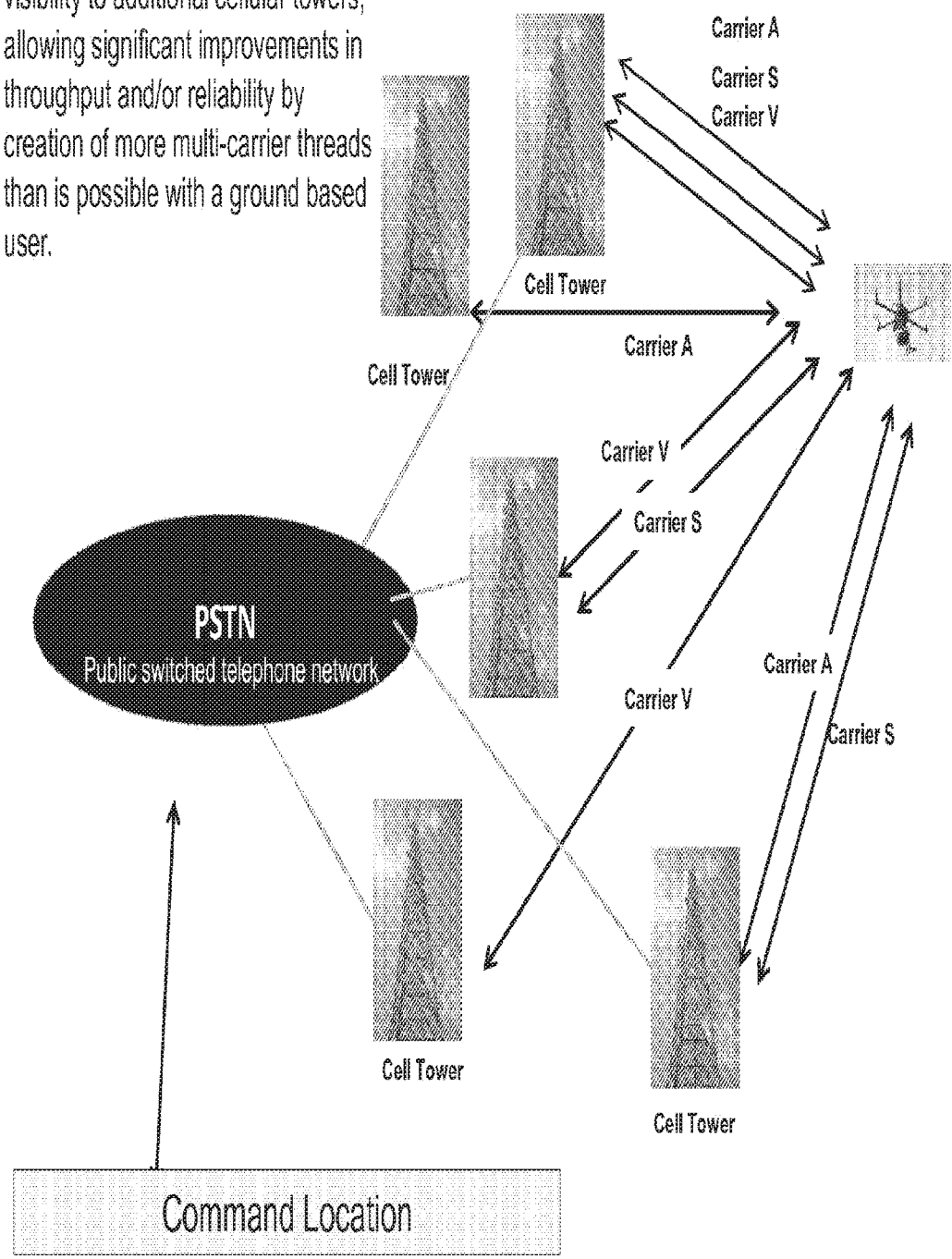
FIG. 4 is a block diagram illustrating an exemplary embodiment whereby the elevated UAS has visibility to additional cellular towers, allowing significant improvements in throughput and/or reliability by creation of more multi-carrier threads than is possible with a ground based user.

FIG. 4 illustrates the process and advantages of altitude and multi-carrier threads. When using cellular data connectivity from ground level, there is typically a very limited number of cellular phone towers which can be utilized to establish network data connectivity. However, when elevated 100', 200', 500', 1000' the number of cellular towers within line-of-sight increases drastically. This process uses the extra towers that are now available to establish additional connections (threads). For example, at ground level a user can typically establish a connection with a limited number of cellular data towers (FIGS. 2, 3). As altitude increases the number of towers visible increases drastically. By establishing multiple threads consisting of multiple carriers across multiple towers both throughput and/or reliability improve.

Figure 5:
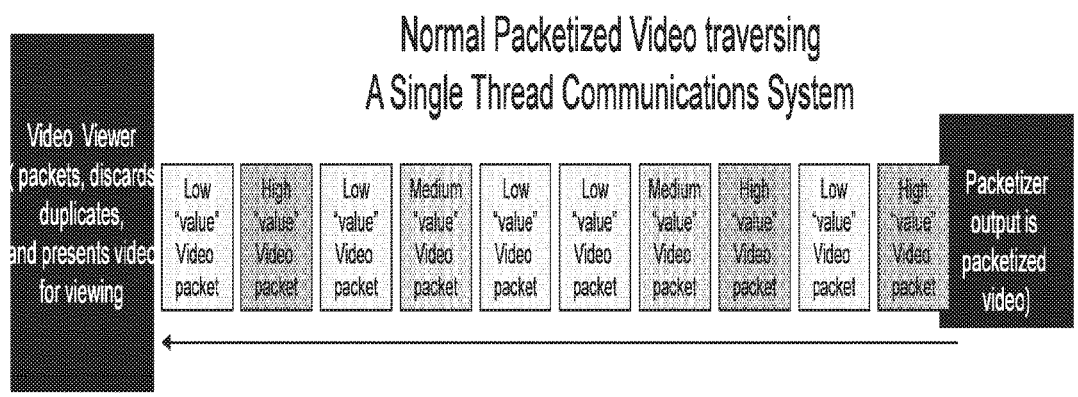
FIG. 5 is a block diagram illustrating a Normal Packetized Video traversing A SINGLE thread Video system.

FIG. 5 is a block diagram illustrating an exemplary embodiment of a Normal Packetized Video traversing A SINGLE thread Video system. In this diagram as in diagrams which follow-for simplicity only-one "frame" of video is diagramed as being carried in one packet of data. This is NOT normally the case nor is it required, but the process is most easily explained if this simplifying assumption is utilized.

Figure 6:
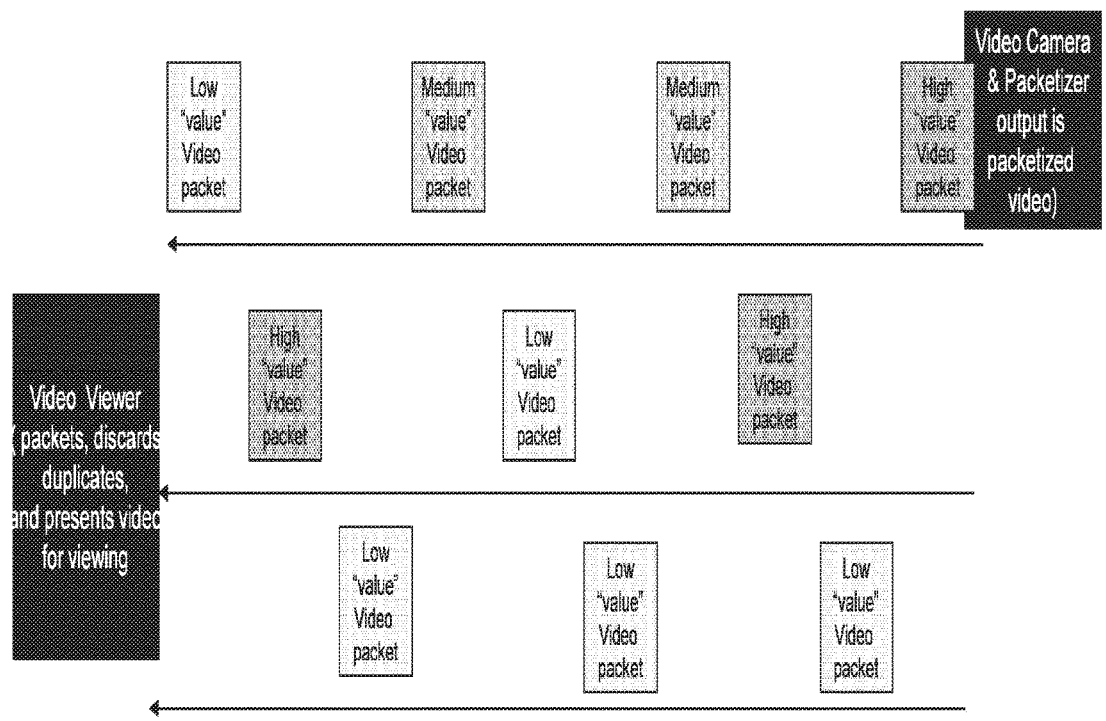
FIG. 6 is a block diagram illustrating an exemplary embodiment of a Normal Packetized Video traversing A Three (3) threaded Video system with NO improvement in Reliability.

FIG. 6 is a block diagram illustrating an exemplary embodiment of a Normal Packetized Video traversing A Three (3) threaded Video system with NO improvement in Reliability. (Demonstration only—there is no real value in implementing this solution vs. a Single Thread solution (FIG. 1). In this example the Video Viewer receives the exact packets as it did in the Single Thread solution with the only difference is it receives the packets on 1 of 3 threads (network paths). NOTE: The process is NOT limited to three (3) threads, the number of threads is limited only by the available communication paths. Three (3) is shown for simplicity of understanding.

Figure 7:
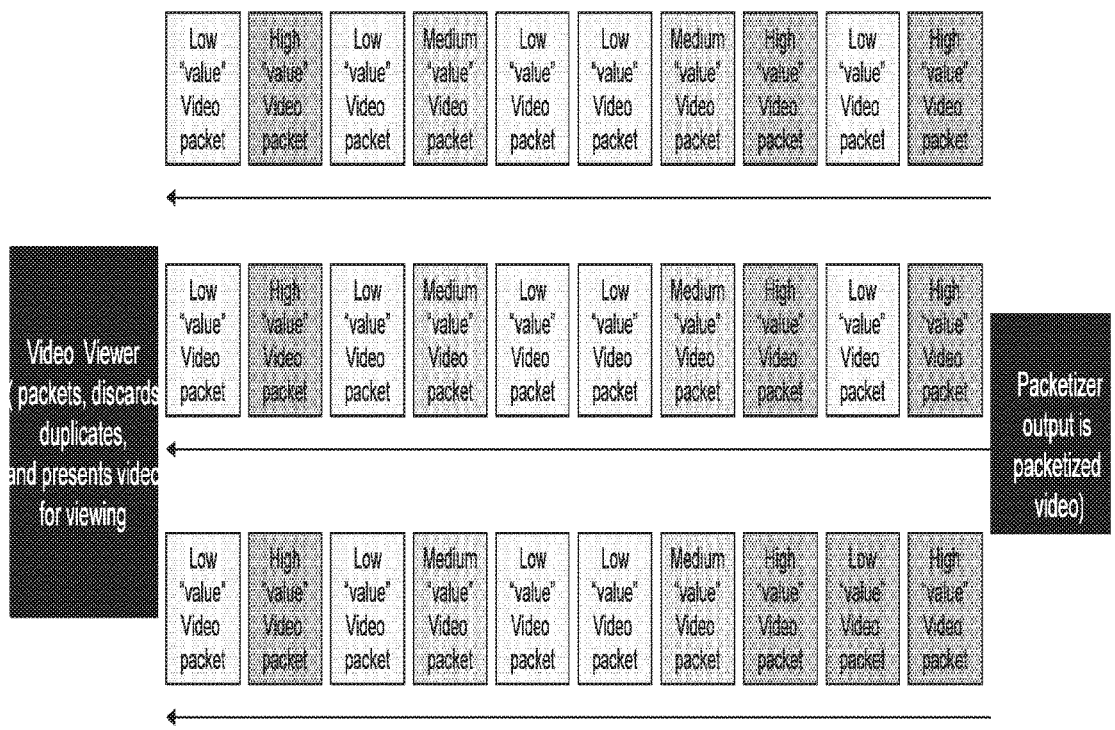
FIG. 7 is a block diagram illustrating an exemplary embodiment of Normal Packetized Video traversing a Three (3) threaded Video system with 3X improvement in Reliability.

FIG. 7 is a block diagram illustrating an exemplary embodiment of Normal Packetized Video traversing a Three (3) threaded Video system with 3X improvement in Reliability. In this diagram, the Video Viewer receives, assuming perfect communications, the three (3) copies of the exact packets as it did in Single Thread solution (FIG. 1). The advantage is that if the communication path is not perfect, the video viewer has three (3) opportunities to receive the packet and recreate the original video stream. Hence, the user of the system is more likely to receive perfect video even if the underlying communications paths drop up to ⅓ of their packets. NOTE: The process is NOT limited to three (3) threads, the number of threads is limited only by the available communication paths. Three (3) is shown for simplicity of understanding.

Figure 8:
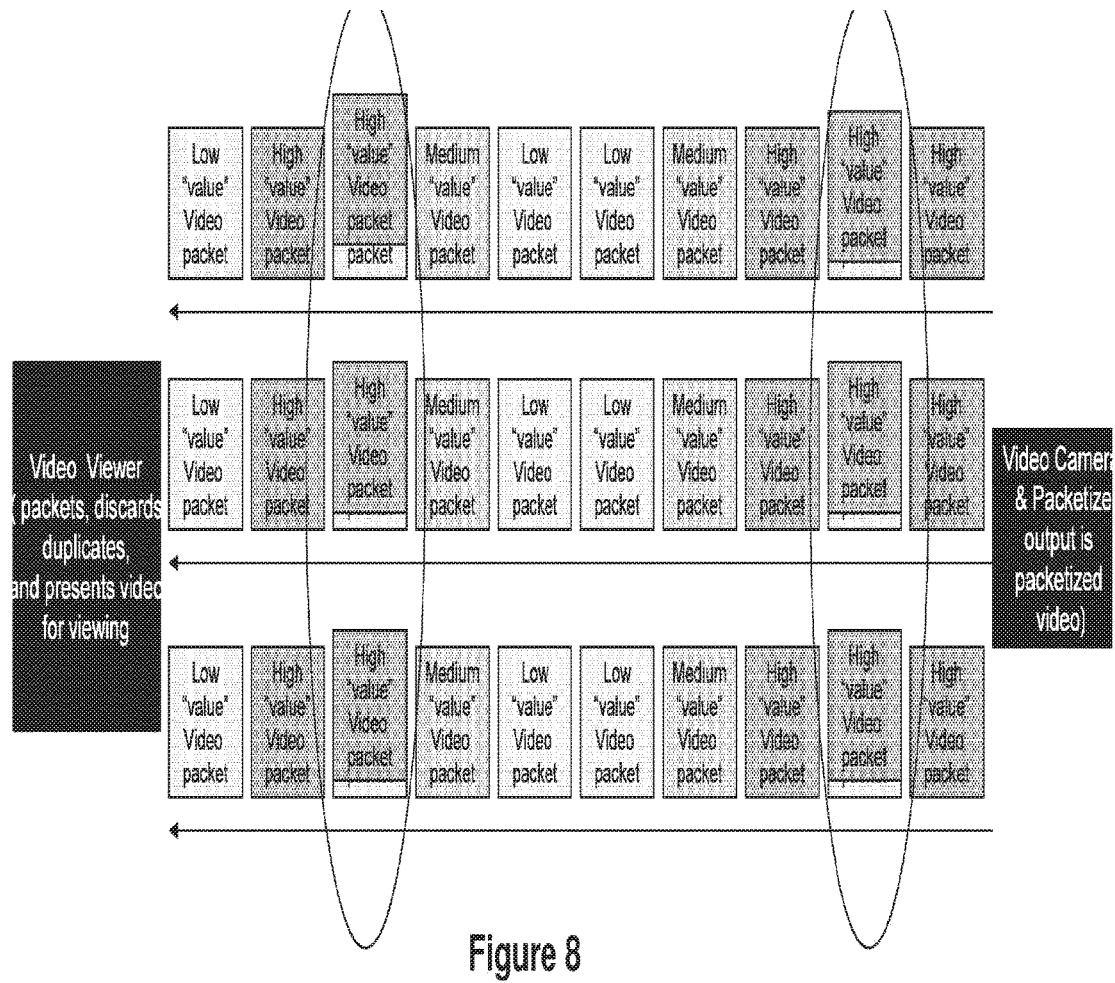
FIG. 8 is a block diagram illustrating an exemplary embodiment of Normal Packetized Video traversing a Three (3) threaded Video system with approximately a 6× improvement in Reliability.

FIG. 8 is a block diagram illustrating an exemplary embodiment of Normal Packetized Video traversing a Three (3) threaded Video system with approximately a 6× improvement in Reliability. In this example, the Video Viewer receives, assuming perfect communications, the three (3) copies of the packets as it did in Single Thread solution (FIG. 1) EXCEPT that a small % (in this example 6 packets) of low value video packets have been replaced in each of the threads by DUPLICATE high value video packets. The advantage is that if the communication path is not perfect, the video viewer has additional opportunities to receive the high value video packets at the expense of receiving less low value video packets. Since high value video packets are more important in creating the original video view than low priority packets the end user is approximately 6× more likely to have a video view close to the original video sequence, at the "cost" of somewhat reduced frame-rate type effects on the viewed video. For video transmission over high loss paths trading low value video frames for high value frames can make good sense. NOTE: The process is NOT limited to three (3) threads, the number of threads is limited only by the available communication paths. Three (3) is shown for simplicity of understanding. Also, the process does not require all of the "replaced" packets to align as they do in the diagram. Normally the "replaced" duplicate packets are randomly assigned throughout the threads to further improve reliability; however for simplification of illustration they are aligned.

Figure 9:
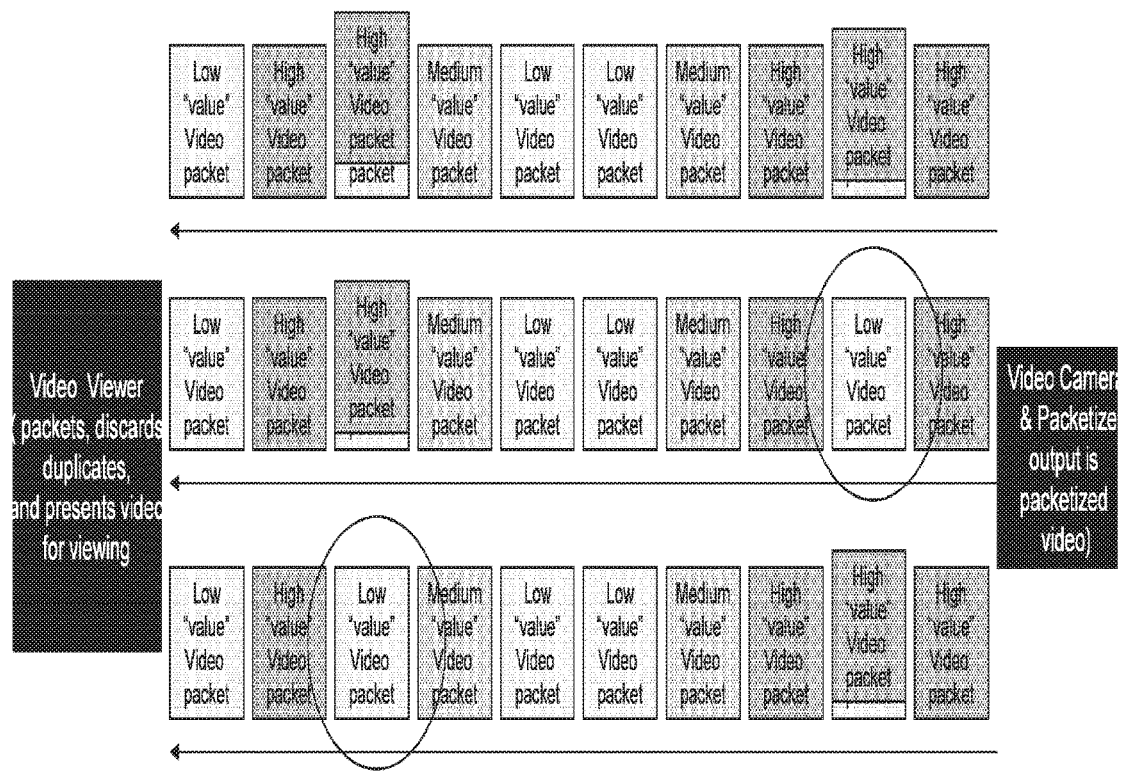
FIG. 9 is a block diagram of an exemplary embodiment of Normal Packetized Video traversing a Three (3) threaded Video system with approximately a 6× improvement in Reliability and a more realistic implementation view.

FIG. 9 is a block diagram of an exemplary embodiment of Normal Packetized Video traversing a Three (3) threaded Video system with approximately a 6× improvement in Reliability and a more realistic implementation view. Similarly to FIG. 4, the Video Viewer receives, assuming perfect communications, the three (3) copies of the packets as it did in Single Thread solution (FIG. 1) EXCEPT that a small 1% (in this example 6 packets) of low value video packets have been replaced in each of the threads by DUPLICATE high value video packets. The difference between FIG. 4 and FIG. 5 is that not 100% of any low value video packet is replaced with high value packets. In FIG. 4, some of the low value video packets had no opportunity to traverse the multi-threaded communication paths because they were replaced at the source (video camera) with high value packets. In this example some (tunable depending on the measured or anticipated reliability of the communication paths) of the low value packets are replaced with high value packets but at least every low value packet is transmitted on at least one of the communication paths. The advantage is that if the communication path is not perfect, the video viewer has additional opportunities to receive the high value video packets at the expense of receiving less low value video packets. Since high value video packets are more important in creating the original video view than low priority packets the end user is approximately 6× more likely to have a video view close to the original video sequence, at the "cost" of somewhat reduced frame-rate type effects on the viewed video. Unlike FIG. 4 in this example, if the communications path is perfect the end viewer will have the exact same viewing experience as in FIG. 1. Additionally if the communications path is less than perfect the probability of the end user have a viewing experience near perfect is significantly greater than would be possible with any other option except FIG. 4. For video transmission over high loss paths trading low value video frames for high value frames can make good sense.

NOTE: The process is NOT limited to three (3) threads, the number of threads is limited only by the available communication paths. Three (3) is shown for simplicity of understanding. Also, the "duplication" of high value packets and the subsequent placing of these high value packets into the data streams is NOT limited to duplication.

The process holds if the high value packets are repeated 3×, 4×, 5×, 10×, 100×, etc. Duplication is shown in the FIG. 5 for illustrative purposes only. In addition, the examples deal with replacing low value packets with high value packets. In reality, some % of high value and, most often, a lower percent of medium value packets would be replicated and replace low value packets. Furthermore, the examples suggest video streams have three (3) values of packets. This is for illustrative purposes only. Some type of video have two value (e.g. high and low), other video types have significantly more than two (2) or three (3). The process is not limited to three classes of video packets, this is illustrative only. Some video streams are such that all frames of video are equal in importance. In this case the replication of some frames is done to allow at least a lower frame rate reconstruction at the viewer should network loss require it. The examples show three threads. Nothing in the process limits the number of threads to three (3). Three is used for illustrative purposes only. Often 2, 3, 4, 10, 100 threads are utilized. The process remains the same without concern for the number of threads. While FIG. 5 shows what could be considered point-to-point threads from video source to video viewer, in practice the threads are nearly always a complex set of links. This concept is particularly useful in the case of a cellular based network where multiple threads can be achieved using a mix of cellular carriers over multiple cell towers.

This process works on Closed and Open loop systems. In the simplified illustrations the number of frames duplicated and replaced is for simplicity of viewing. In actual systems statistical probability of loss of data over the communication paths dictates the amount of replication and insertion of packets. For example, in a system where packet (i.e. frame in our simplified case) loss is measured or anticipated to be 50% one would want to at least replicate the important frames 2×, likely 3× or 4× to if loss of any video is considered high priority (i.e. teleoperation of a vehicle). In OPEN loop systems the operator must use pre-existing data to assess the amount of replication and replacement required. In CLOSED loop system the system can measure the amount of loss occurring and dynamically have the sending unit increase the replication and replacement—likely by reducing other factors such as resolution and/or frame-rate—such that the network pipe is fully utilized but not put into a state of congestion.

According to a further embodiment, the embodiments described in FIGS. 2-4 and the accompanying description, is used in conjunction with the embodiment of FIGS. 6-9 and the accompanying description.

While various embodiments have been described above, it should be understood that they have been presented by way of example only, and not limitation. Where process and/or schematics described above indicate certain events and/or flow patterns occurring in certain order, the ordering of certain events and/or flow patterns may be modified. While the embodiments have been particularly shown and described, it will be understood that various changes in form and details may be made.

The invention claimed is:
1. A method, comprising:
establishing, from an aerial network entity at an above-ground altitude, a plurality of data connections with a network, a first subset of the plurality of data connections being associated with a first carrier, a second subset of the plurality of data connections being associated with a second carrier different from the first carrier;

generating a plurality of data packets collectively representing a data file, the plurality of data packets including a first subset of data packets and a second subset of data packets, each data packet in the first subset of data packets and the second subset of data packets being associated with a priority indicator indicating a priority of that data packet;

sending, to the network and via the first subset of data connections, the first subset of the data packets;

sending, to the network and via the second subset of data connections, the second subset of data packets; and while sending the first subset of data packets:
  determining a portion of the first subset of data packets having a priority indicator that indicates that each data packet in the portion of the first subset of data packets has been designated as a low priority data packet, and
  replacing a subset of the portion of the first subset of data packets with a duplicate portion of the first subset of data packets, each data packet in the duplicate portion of the first subset of data packets having a priority indicator that designates that data packet as a high priority data packet.

2. The method of claim 1, wherein each data packet in the plurality of data packets includes a portion of one of (1) a video file or (2) an image file.

3. The method of claim 1, wherein the second subset of data packets are duplicative of the first subset of data packets.

4. The method of claim 1, wherein:
the plurality of data connections is a first plurality of data connections, the aerial network entity generates the data file,
the method further comprising:
  causing the above-ground altitude of the aerial network entity to be altered; and
  establishing a second plurality of data connections with the network in response to the altitude of the above-ground aerial network entity being altered, the second plurality of data connections being associated with a third carrier; and
  sending a third subset of data packets from the plurality of data packets to a first data connection from the second plurality of data connections and not to a second data connection from the second plurality of data connections, the third subset of data packets being duplicative of the first subset of data packets.

5. The method of claim 1, wherein a low priority data packet includes a low-quality representation of a portion of the data file.

6. The method of claim 1, wherein:
the second subset of data packets are duplicative of the first subset of data packets; and
each data packet in the second subset of data packets is a low priority data packet.

7. An apparatus, comprising:
a wireless-enabled device, in a network entity at an above-ground altitude, configured to establish a plurality of data connections with a plurality of network devices, each data connection from the plurality of data connections being associated with a carrier from a plurality of carriers;
the wireless-enabled device configured to generate a plurality of data packets collectively representing a data file, the plurality of data packets including a first subset of data packets and a second subset of data packets, each data packet in the first subset of data packets and each data packet in the second subset of data packets being associated with a priority indicator indicating a priority of that data packet;
the wireless-enabled device configured to send, to the network and via the plurality of data connections, the first subset of data packets and the second subset of data packets, the wireless-enabled device configured to replace portions of the first subset data packets with a duplicate portions of the first subset of data packets, each data packet in the duplicate portions of the first subset of data packets having a priority indicator that designates that data packet as a high priority data packet.

8. The apparatus of claim 7, wherein the second subset of data packets are duplicative of the first subset of data packets.

9. The apparatus of claim 7, wherein:
the plurality of data connections is a first plurality of data connections, the data file being generated by the wireless-enabled device, the wireless-enabled device further configured to alter the above-ground altitude of the wireless-enabled device, the wireless-enabled device further configured to establish a second plurality of data connections with the network in response to the altitude of the wireless-enabled device being altered, the second plurality of data connections being associated with a third carrier, the wireless-enabled device further configured to send a third subset of data packets from the plurality of data packets to a subset of the second plurality of data connections, the third subset of data packets being duplicative of the first subset of data packets.

10. The apparatus of claim 7, wherein a data packet from the plurality of data packets includes a high-quality representation of a portion of the data file, the priority indicator of that data packet having a high priority.

11. The apparatus of claim 7, wherein a data packet from the plurality of data packets includes a low-quality representation of a portion of the data file, the priority indicator of that data packet having a low priority.

12. The apparatus of claim 7, wherein:
the second subset of data packets are duplicative of the first subset of data packets; and
each data packet in the second subset of data packets is a low priority data packet.

13. The apparatus of claim 7, wherein:
for each data packet in the first subset of data packets:
  the wireless-enabled device is further configured to send a plurality of duplicative data packets, including a data packet in the second subset of data packets, that are duplicative of the data packet in the first subset of data packets, at least one data packet of the plurality of duplicative data packets having a priority indicator that indicates that that data packet in the plurality of duplicative data packets has been designated as a low priority data packet.

14. The apparatus of claim 7, wherein each data packet in the plurality of data packets includes a portion of one of (1) a video file or (2) an image file.

15. A method, comprising:
operatively coupling to a network that is coupled to a plurality of data connections, a first subset of the plurality of data connections being associated with a first carrier, a second subset of the plurality of data connections being associated with a second carrier;

receiving, via the network and via the first subset of data connections, a first subset of the data packets from a plurality of data packets that represent a data file, the first subset of data packets having (1) a portion of data packets with a low priority and (2) a portion of data packets with a high priority that has replaced data packets with the low priority;

receiving, via the network and via the second subset of data connections, a second subset of data packets from the plurality of data packets, each data packet in the second subset of data packets being associated with a priority indicator indicating a priority of that data packet; and sending sensor data based on the first subset of data packets and the second subset of data packets.

16. The method of claim 15, wherein a data packet from the plurality of data packets includes a high-quality representation of a portion of the data file, the priority indicator of that data packet having the high priority.

17. The method of claim 15, wherein a data packet from the plurality of data packets includes a low-quality representation of a portion of the data file, the priority indicator of that data packet having the low priority.

18. The method of claim 15, further comprising:
assembling a copy of the data file using the first subset of the data packets and the second subset of the data packets.

19. The method of claim 15, further comprising:
assembling a copy of the data file using the first subset of the data packets and the second subset of the data packets; and
comparing the copy of the data file with directions sent to a wireless-enabled device.

20. The method of claim 15, wherein each data packet in the plurality of data packets includes a portion of one of (1) a video file or (2) an image file.

* * * * *